(12) United States Patent
Higashimura et al.

(10) Patent No.: US 6,383,636 B2
(45) Date of Patent: May 7, 2002

(54) (2,5-DISUBSTITUTED-1,4-PHENYLENE OXIDE) BLOCK OR GRAFT COPOLYMER

(75) Inventors: Hideyuki Higashimura; Shuhei Namekawa, both of Tsukuba; Shiro Kobayashi, Kyoto, all of (JP)

(73) Assignees: Director-General of National Institute of Advanced Industrial Science and Technology, Ministry of Economy, Trade and Industry; Japan Chemical Innovation Institute, both of Tokyo (JP)

( * ) Notice: Subject to any disclaimer, the term of this patent is extended or adjusted under 35 U.S.C. 154(b) by 0 days.

(21) Appl. No.: 09/818,758

(22) Filed: Mar. 28, 2001

(30) Foreign Application Priority Data

Apr. 4, 2000 (JP) .......................... 2000-102668
May 29, 2000 (JP) .......................... 2000-158553

(51) Int. Cl.$^7$ .......................... B32B 15/02; C08G 63/00
(52) U.S. Cl. .................. 428/402; 528/176; 528/191; 528/206; 528/212; 528/219; 528/308; 528/308.6
(58) Field of Search ................. 528/176, 191, 528/206, 212, 219, 308, 308.6; 428/402

(56) References Cited

FOREIGN PATENT DOCUMENTS

JP          2000336166          12/2000

OTHER PUBLICATIONS

J. Am. Chem. Soc., 81, pp. 6335–6336 (1959).
Macromolecules, vol. 2, pp. 107–108 (1969).
J. Polym. Sci.: Part A: Polymer Chemistry, 36, pp. 505–517 (1998).
Polymer Preprints, Japan, vol. 49, No. 7 (2000).

Primary Examiner—Samuel A. Acquah
(74) Attorney, Agent, or Firm—Birch, Stewart, Kolasch & Birch, LLP

(57) ABSTRACT

There is disclosed a (2,5-disubstituted-1,4-phenylene oxide) block copolymer which comprises one or more block structural units represented by formula (I) and at least one particular divalent structural unit in a molecule. There is also disclosed a (2,5-disubstituted-1,4-phenylene oxide) graft polymer which comprises one or more structural units of formula (IV), or three or more of structural unit of formula (IV) and particular divalent structural unit, in a molecule.

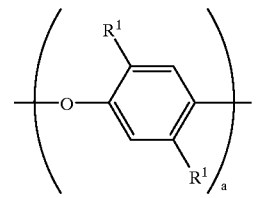

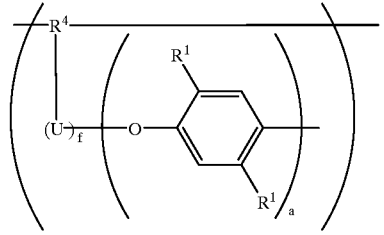

(wherein $R^1$ represents an unsubstituted or substituted hydrocarbon group, and the two $R^1$s may be the same or different; a represents a number average degree of polymerization and is 5 or more; $R^4$ represents a trifunctional unsubstituted or substituted hydrocarbon group; U represents —CO—, —OCO—, or —NHCO—; and f is 1 or 0.)

15 Claims, No Drawings

(2,5-DISUBSTITUTED-1,4-PHENYLENE OXIDE) BLOCK OR GRAFT COPOLYMER

FIELD OF THE INVENTION

The present invention relates to (2,5-disubstituted-1,4-phenylene oxide) copolymers.

BACKGROUND OF THE INVENTION

Poly (2,6-disubstituted-1,4-phenylene oxide) is synthesized by oxidative polymerization of 2,6-disubstituted phenols, and it is widely known to show high heat resistance. For example, poly (2,6-dimethyl-1,4-phenylene oxide) is reported in J. Am. Chem. Soc., 81, 6335–6336 (1959), and poly (2,6-diphenyl-1,4-phenylene oxide) is reported in Macromolecules, 2, 107–108 (1969). Phenols with substituents at positions 2 and 6 are used in order to block coupling of the two ortho positions, as described in J. Polym. Sci.: Part A: Polymer Chemistry, 36, 505–517 (1998).

The inventors succeeded in synthesizing crystalline poly (2,5-dimethyl-1,4-phenylene oxide) from 2,5-dimethylphenol, which does not have a substituent at one ortho position (see Japanese Patent Application No. 2000-25621). The polymer shows a high crystalline melting point, even after melting and cooling, and it is expected to be a crystalline polymer having high heat resistance and solvent resistance. However, the mechanical properties and impact strength of molded articles made from this polymer have not been satisfactory enough, therefore further improvement is needed.

SUMMARY OF THE INVENTION

The present invention is a (2,5-disubstituted-1,4-phenylene oxide) block copolymer which comprises one or more block structural units represented by the following formula (I) and at least one structural unit represented by the following formula (II) or the following formula (III) in a molecule,

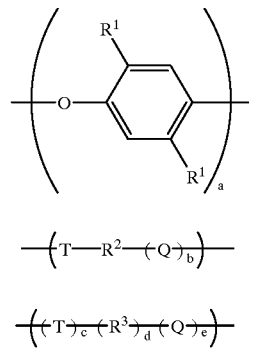

(I)

(II)

(III)

wherein $R^1$ represents an unsubstituted hydrocarbon group or a substituted hydrocarbon group, and the two $R^1$s may be the same or different; $R^2$ represents an unsubstituted arylene group or a substituted arylene group; $R^3$ represents an unsubstituted alkylene group, a substituted alkylene group, an unsubstituted alkylene group, a substituted aralkylene group, an unsubstituted alkenylene group, a substituted alkenylene group, an unsubstituted aralkenylene group, a substituted aralkenylene group, an unsubstituted alkynylene group, a substituted alkynylene group, an unsubstituted aralkynylene group, or a substituted aralkynylene group; T represents —CO—, —CONH— or —SO$_2$—; Q represents —O—, —CO—, —SO$_2$—, —OCO—, —NHCO—, or —OSi(CH$_3$)$_2$—; a represents a number average degree of polymerization and is the number of 5 or more; and b, c, d, and e are each 1 or 0, and at least one of c, d, or e is 1.

Further the present invention is a (2,5-disubstituted-1,4-phenylene oxide) graft polymer which comprises one or more structural units represented by the following formula (IV), or three or more of structural unit of the following formula (IV) and structural unit of the following formula (V), in a molecule,

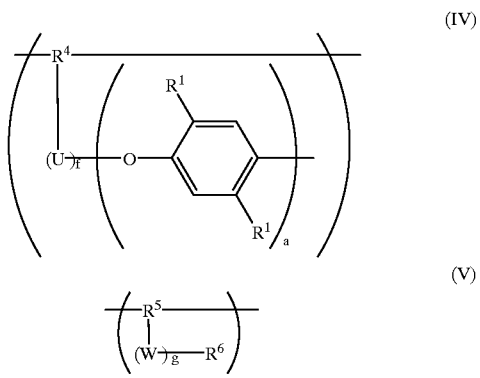

(IV)

(V)

wherein $R^1$ represents an unsubstituted hydrocarbon group or a substituted hydrocarbon group, and the two $R^1$s may be the same or different; $R^4$ and $R^5$ each represents a trifunctional unsubstituted hydrocarbon group or a trifunctional substituted hydrocarbon group; $R^6$ represents a hydrogen atom, a halogen atom, an unsubstituted hydrocarbon group, or a substituted hydrocarbon group; U represents —CO—, —OCO—, or —NHCO—; W represents —O—, —CO—, —CO$_2$— —OCO—, or —CONH—; a represents a number average degree of polymerization and is the number of 5 or more; and f and g are each 1 or 0.

Other and further features, and advantages of the invention will appear more fully from the following description.

DETAILED DESCRIPTION OF THE INVENTION

According to the present invention, there is provided:

(1) A (2,5-disubstituted-1,4-phenylene oxide) block copolymer which comprises one or more block structural units represented by the following formula (I) and at least one structural unit represented by the following formula (II) or the following formula (III) in a molecule,

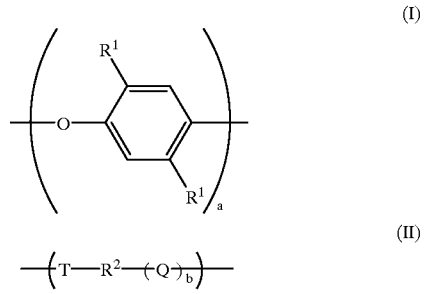

(I)

(II)

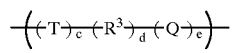

(III)

wherein $R^1$ represents an unsubstituted hydrocarbon group or a substituted hydrocarbon group, and the two $R^1$s may be the same or different; $R^2$ represents an unsubstituted arylene group or a substituted arylene group; $R^3$ represents an unsubstituted alkylene group, a substituted alkylene group, an unsubstituted aralkylene group, a substituted aralkylene group, an unsubstituted alkenylene group, a substituted alkenylene group, an unsubstituted aralkenylene group, a substituted aralkenylene group, an unsubstituted alkynylene group, a substituted alkynylene group, an unsubstituted aralkynylene group, or a substituted aralkynylene group; T represents —CO—, —CONH— or —SO$_2$—; Q represents —O—, —CO—, —SO$_2$—, —OCO—, —NHCO—, or —OSi(CH$_3$)$_2$—; a represents a number average degree of polymerization and is the number of 5 or more; and b, c, d, and e are each 1 or 0, and at least one of c, d, or e is 1;

(2) The (2,5-disubstituted-1,4-phenylene oxide) block copolymer according to (1), wherein a in the formula (I) is 5 to 5,000, and, in a molecule, the number of the block structural units represented by the formula (I) is 1 to 1,000 and the number of the structural units represented by the formula (II) and/or the formula (III) is 1 to 1,000,000;

(3) A (2,5-disubstituted-1,4-phenylene oxide) graft polymer (homopolymer or copolymer) which comprises one or more structural units represented by the following formula (IV), or three or more of structural unit of the following formula (IV) and structural unit of the following formula (V), in a molecule,

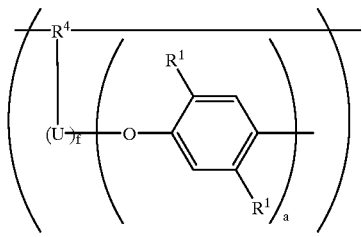

(IV)

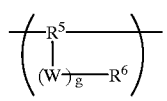

(V)

wherein $R^1$ represents an unsubstituted hydrocarbon group or a substituted hydrocarbon group, and the two $R^1$s may be the same or different; $R^4$ and $R^5$ each represents a trifunctional unsubstituted hydrocarbon group or a trifunctional substituted hydrocarbon group; $R^6$ represents a hydrogen atom, a halogen atom, an unsubstituted hydrocarbon group, or a substituted hydrocarbon group; U represents —CO—, —OCO—, or —NHCO—; W represents —O—, —CO—, —CO$_2$— —OCO—, or —CONH—; a represents a number average degree of polymerization and is the number of 5 or more; and f and g are each 1 or 0;

(4) The (2,5-disubstituted-1,4-phenylene oxide) graft polymer according to (3), wherein a in the formula (IV) is 5 to 5,000, and, in a molecule, the number of the structural units represented by the formula (IV) is 1 to 100,000 and the number of the structural units represented by the formula (IV) and/or the formula (V) is 3 to 1,000,000;

(5) The (2,5-disubstituted-1,4-phenylene oxide) graft polymer according to (3) or (4), wherein f in the formula (IV) is 1;

(6) The (2,5-disubstituted-1,4-phenylene oxide) block or graft polymer according to any one of (1) to (5), wherein the polymer is a powder having an average particle diameter of 5 mm or less;

(7) The (2,5-disubstituted-1,4-phenylene oxide) block or graft polymer according to any one of (1) to (6), wherein the polymer shows an exothermic peak of crystallization of 5 J/g or more at 150° C. or more when cooled after being melted, and/or the polymer shows an endothermic peak of crystal melting of 5 J/g or more at 150° C. or more when re-heated after the melted polymer is cooled; and (8) The (2,5-disubstituted-1,4-phenylene oxide) block or graft polymer according to any one of (1) to (7), wherein the polymer is substantially free from gel substance.

Herein, the term "a group" on a compound means to include both the group unsubstituted and the group having a further substituent thereon, unless otherwise specified.

The present invention will be described in detail hereinafter.

(1) Block Copolymer

The (2,5-disubstituted-1,4-phenylene oxide) block copolymer in the present invention means a polymer which comprises one or more block structural units represented by the above-mentioned formula (I) and one or more structural units represented by the above-mentioned formula (II) and/or the above-mentioned formula (III) in a molecule.

The unsubstituted hydrocarbon group as $R^1$ in the above-mentioned formula (I) is preferably an alkyl group with 1 to 30 (more preferably 1 to 20) carbon atoms, an aralkyl group with 7 to 30 (more preferably 7 to 20) carbon atoms, or an aryl group with 6 to 30 (more preferably 6 to 20) carbon atoms, and the specific examples include methyl group, ethyl group, n-propyl group, iso-propyl group, n-butyl group, iso-butyl group, t-butyl group, pentyl group, cyclopentyl group, hexyl group, cyclohexyl group, octyl group, decyl group, dodecyl group, pentadecyl group, octadecyl group, benzyl group, 2-phenylethyl group, 1-phenylethyl group, phenyl group, 4-methylphenyl group, 1-naphthyl group, 2-naphthyl group, or the like.

The substituted hydrocarbon group as $R^1$ in the above-mentioned formula (I) is preferably an alkyl group with 1 to 30 (more preferably 1 to 20) carbon atoms, an aralkyl group with 7 to 30 (more preferably 7 to 20) carbon atoms, or an aryl group with 6 to 30 (more preferably 6 to 20) carbon atoms, which is substituted with a halogen atom, an alkoxy group, a disubstituted amino group, or the like, and the specific examples include a trifluoromethyl group, a 2-t-butyloxyethyl group, a 3-diphenylaminopropyl group, or the like.

The two $R^1$s in the above-mentioned formula (I) are preferably hydrocarbon groups with 1 to 20 carbon atoms, more preferably with 1 to 10 carbon atoms, and even more preferably 1 to 6 carbon atoms.

The symbol a in the above-mentioned formula (I) represents a number average degree of polymerization of the repeating units in the formula (I), and is the number of 5 or more. It is not preferable that the symbol a is less than 5, because the properties as a block copolymer are not fully exhibited in such a case. The symbol a is generally the number of a range from 5 to 5,000, and within this range, the number is preferably 1,000 or less, more preferably 500 or less, and even more preferably 100 or less. Within this range, the number is preferably 5 or more, more preferably 10 or more, and even more preferably 15 or more.

In the block structural units of the above-mentioned formula (I), structures other than the repeating unit (2,5-disubstituted-1,4-phenylene oxide) in the formula (I) may be included, provided that the desired properties of the block copolymer of the present invention are not impaired. Examples of the structures other than the repeating unit in the above-mentioned formula (I) include structural units represented by the following formulae (VI) to (XI), a structural unit represented by the following formula (X), a structural unit represented by the following formula (XI), or the like. The content of the structures other than the repeating unit in the above-mentioned formula (I) is preferably 20 units or less, more preferably 10 units or less, and even more preferably 5 units or less, based on 100 (2,5-disubstituted-1,4-phenylene oxide) units in the formula (I).

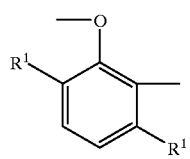
(VI)

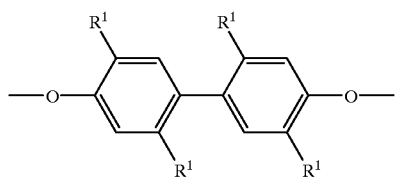
(VII)

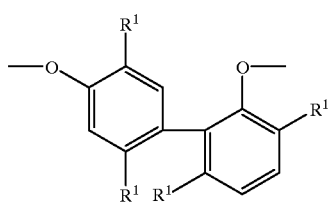
(VIII)

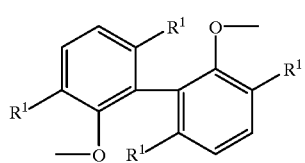
(IX)

(wherein $R^1$ has the same meaning as that in the above-mentioned formula (I) and all the $R^1$s may be the same or different)

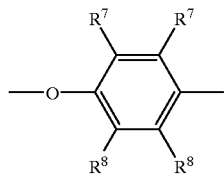
(X)

(wherein $R^7$ and $R^8$ each represents a hydrogen atom, an unsubstituted hydrocarbon group, or a substituted hydrocarbon group and the two $R^7$s and the two $R^8$s may be the same or different, and the two $R^7$s and/or the two $R^8$s may form rings)

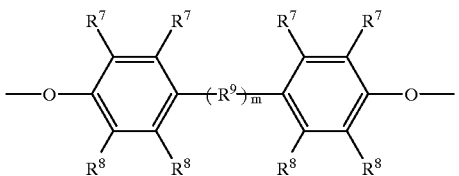
(XI)

(wherein $R^7$ and $R^8$ each has the same meaning as that in the above-mentioned formula (X) and all the $R^7$s and $R^8$s may be the same or different, and the two $R^7$s and/or $R^8$s on the same benzene ring may form rings; $R^9$ represents oxygen atom, sulfur atom, sulfonyl group, carbonyl group, a divalent unsubstituted hydrocarbon group, or a divalent substituted hydrocarbon group; and m is 1 or 0).

Specific examples and preferable groups for $R^1$ in the above-mentioned formulae (VI) to (XI) are the same as those in the above-mentioned formula (I).

Unsubstituted hydrocarbon groups as $R^7$ and $R^8$ in the above-mentioned formula (X) are preferably alkyl groups with 1 to 30 (more preferably 1 to 20) carbon atoms, aralkyl groups with 7 to 30 (more preferably 7 to 20) carbon atoms, or aryl groups with 6 to 30 (more preferably 6 to 20) carbon atoms when the two $R^7$s and the two $R^8$s do not from rings. Specifically, examples of the hydrocarbon group include methyl group, ethyl group, n-propyl group, iso-propyl group, n-butyl group, iso-butyl group, t-butyl group, pentyl group, cyclopentyl group, hexyl group, cyclohexyl group, octyl group, decyl group, dodecyl group, pentadecyl group, octadecyl group, benzyl group, 2-phenylethyl group, 1-phenylethyl group, phenyl group, 4-methylphenyl group, 1-naphthyl group, and 2-naphthyl group. When the two $R^7$s and the two $R^8$s form rings, five- to seven-membered rings are preferable, and more preferably, the two $R^7$s and the two $R^8$s may form rings composed of —(CH$_2$)$_3$— group, —(CH$_2$)$_4$— group, and/or —CH=CH—CH=CH— group.

Substituted hydrocarbon groups as R7 and R8 in the above-mentioned formula (X) are preferably alkyl groups with 1 to 30 (more preferably 1 to 20) carbon atoms, aralkyl groups with 7 to 30 (more preferably 7 to 20) carbon atoms, or aryl groups with 6 to 30 (more preferably 6 to 20) carbon atoms, which are substituted with a substituent such as a halogen atom, an alkoxy group, a disubstituted amino group, or the like, when the two $R^7$s and the two $R^8$s do not from rings, and the specific examples include trifluoromethyl group, 2-t-butyloxyethyl group, 3-diphenylaminopropyl group, or the like. When the two $R^7$s and the two $R^8$s form a ring, the ring is preferably a five- to seven-membered ring which has the above-mentioned substituents, and more preferably the two $R^7$s and the two $R^8$s may form rings composed of —CH$_2$—O—CH$_2$— group, —(CH$_2$)$_4$— group, and/or —CH=CH—CH=CH— group, which has the above-mentioned substutuents.

As R$^7$ and R$^8$ in the above-mentioned formula (X), a hydrogen atom or a hydrocarbon group with 1 to 30 carbon atoms is preferred, and a hydrogen atom or an alkyl group with 1 to 20 carbon atoms is more preferred. Even more preferably, R$^7$ is a hydrogen atom or an alkyl group with 1 to 20 carbon atoms and R$^8$ is a hydrogen atom or methyl group.

Specific examples and preferable groups for R$^7$ and R8 in the above-mentioned formula (XI) are the same as those in the above-mentioned formula (X).

The divalent unsubstituted hydrocarbon group as R$^9$ in the above-mentioned formula (XI) is preferably an alkylene group with 1 to 30 (more preferably 1 to 20) carbon atoms, an aralkylene group with 7 to 30 (more preferably 7 to 20) carbon atoms, or an arylene group with 6 to 30 (more preferably 6 to 20) carbon atoms, and the specific examples include methylene group, 1,1-ethylene group, 1,2-ethylene group, 1,1-propylene group, 1,3-propylene group, 2,2-propylene group, 1,1-butylene group, 2,2-butylene group, 3-methyl-2,2-butylene group, 3,3-dimethyl-2,2-butylene group, 1,1-pentylene group, 3,3-pentylene group, 1,1-hexylene group, 1,1-heptylene group, 1,1-octylene group, 1,1-nonylne group, 1,1-dodecylene group, 1,1-pentadecylene group, 1,1-octadecylene group, 1,1-cyclopentylene group, 1,1-cyclohexylene group, phenylmethylene group, diphenylmethylene group, 1-phenyl-1,1-ethylene group, 9,9-fluorene group, α,α'-1,4-diisopropyl group, 1,2-phenylene group, 1,3-phenylene group, 1,4-phenylene group, or the like.

The divalent substituted hydrocarbon group as R$^9$ in the above-mentioned formula (XI) is preferably an alkylene group with 1 to 30 (more preferably 1 to 20) carbon atoms, an aralkylene group with 7 to 30 (more preferably 7 to 20) carbon atoms, or an arylene group with 6 to 30 (more preferably 6 to 20) carbon atoms, and the specific examples include hexafluoro-2,2-propylene group, pentafluorophenyl-methylene group, 4-methoxyphenylmethylene group, 4-dimethylaminophenylmethylene group, or the like.

As R$^9$ in the above-mentioned formula (XI), an oxygen atom or a divalent hydrocarbon group is preferable, and an alkylene group with 1 to 20 carbon atoms or an aralkylene group with 7 to 20 carbon atoms is more preferable, and an alkylene group with 1 to 6 carbon atoms is even more preferable.

The content of the structures other than the repeating unit of the above-mentioned formula (I), which may be contained in the block structural unit represented by the formula (I), is preferably 20 units or less, more preferably 10 units or less, and even more preferably 5 units or less, based on 100 repeating units in the block structural units represented by the formula (I).

The unsubstituted arylene group as R$^2$ in the above-mentioned formula (II) is preferably an arylene group with 6 to 30 (more preferably 6 to 20) carbon atoms, and the specific examples include 1,2-phenylene group, 1,3-phenylene group, 1,4-phenylene group, 2-methyl-1,4-phenylene group, 2,3-diemethyl-1,4-phenylene group, 2,5-diemethyl-1,4-phenylene group, 2,6-dimethyl-1,4-phenylene group, 2,3,5-trimethyl-1,4-phenylene group, tetramethyl-1,4-phenylene group, 2-ethyl-1,4-phenylene group, 2-propyl-1,4-phenylene group, 2-butyl-1,4-phenylene group, 2-pentyl-1,4-phenylene group, 2-hexyl-1,4-phenylene group, 2-phenyl-1,4-phenylene group, 2-benzyl-1,4-phenylene group, 1,4-naphthylene group, 2,3-naphthylene group, 1,5-naphthylene group, 2,6-naphthylene group, 4,4'-biphenylene group, 3,3'-biphenylene group, 3,4'-biphenylene group, 2,2'-biphenylene group, or the like.

The substituted allylene group as R$^2$ in the above-mentioned formula (II) is preferably an arylene group with 6 to 30 (more preferably 6 to 20) carbon atoms which is substituted with a halogen atom, an alkoxy group, a disubstituted amino group, or the like, and the specific examples include tetrafluoro-1,4-phenylene group, 2-chloro-1,4-phenylene group, 2-ethoxy-1,4-phenylene group, 2-dimethylamino-1,4-phenylene group, or the like.

R$^2$ in the above-mentioned formula (II) is preferably an arylene group with 6 to 20 carbon atoms, more preferably an arylene group with 6 to 12 carbon atoms, and even more preferably 1,4-phenylene group, 1,3-phenylene group, 2,5-dimethyl-1,4-phenylene group, or 2,6-naphthylene group.

The unsubstituted alkylene group as R$^3$ in the above-mentioned formula (III) is preferably an alkylene group with 1 to 30 (more preferably 1 to 20) carbon atoms, and the specific examples include methylene group, 1,1-ethylene group, 1,2-ethylene group, 1,2-propylene group, 1,3-proypelene group, 1,4-butylene group, 1,5-penthylene group, 1,6-hexylene group, 1,12-dodecylene group, 1,18-octadecylene group, 1,4-cyclohexylene group, or the like.

The substituted alkylene group as R$^3$ in the above-mentioned formula (III) is preferably an alkylene group with 1 to 30 (more preferably 1 to 20) carbon atoms which is substituted with a halogen atom, a hydroxyl group, an alkoxy group, a phenoxy group, an amino group, a substituted amino group, an alkoxycarbonyl group, an aminocarbonyl group, a nitrile group, or the like, and the specific examples include chloro-1,2-ethylene group, tetrafluoro-1,2-ethylene group, methoxy-1,2-ethyelene group, methoxycarbonyl-1,2-ethylene group, or the like.

The unsubstituted aralkylene group as R$^3$ in the above-mentioned formula (III) is preferably an aralkylene group with 7 to 30 (more preferably 7 to 20) carbon atoms, and the specific examples include 1-phenyl-1,1-methylene group, 2-phenyl-1,1-etheylene group, 1-phenyl-1,2-ethylene group, 1-phenyl-1,2-propylene group, 1,3-propylene group, 1-phenyl-1,4-butylene group, 1-phenyl-1,5-pentylene group, 1-phenyl-1,6-hexylene group, 1-phenyl-1,12-dodecylene group, or the like.

The substituted aralkylene group as R$^3$ in the above-mentioned formula (III) is preferably an aralkylene group with 7 to 30 (more preferably 7 to 20) carbon atoms which is substituted with a halogen atom, a hydroxyl group, an alkoxy group, a phenoxy group, an amino group, a substituted amino group, an alkoxycarbonyl group, an aminocarbonyl group, a nitrile group, or the like, and the specific examples include 4-chlorophenyl-1,2-ethylene group, 4-methoxyphenyl-1,2-ethylene group, or the like.

The unsubstituted alkenylene group as R$^3$ in the above-mentioned formula (III) is preferably an alkenylene group with 2 to 30 (more preferably 2 to 20) carbon atoms, and the specific examples include 1,1-ethenylene group, 1,2-ethenylene group, 1,2-(1-propenylene) group, 1,3-(1-propenylene) group, 1,4-(1-butenylene) group, 1,5-(1-pentenylene) group, 1,6-(1-hexenylene) group, 1,12-(1-dodecenylene) group, 1,18-(1-octadecenylene) group, 1,4-(2-cyclohexenylene) group, or the like.

The substituted alkenylene group as R$^3$ in the above-mentioned formula (III) is preferably an alkenylene group with 1 to 30 (more preferably 1 to 20) carbon atoms which is substituted with a halogen atom, a hydroxyl group, an alkoxy group, a phenoxy group, an amino group, a substituted amino group, an alkoxycarbonyl group, an aminocarbonyl group, a nitrile group, or the like, and the specific examples include chloro-1,2-ethenylene group, tetrafluoro-1,2-ethenylene group, methoxy-1,2-ethenylene group, methoxycarbonyl-1,2-ethenylene group, or the like.

The unsubstituted aralkenylene group as $R^3$ in the above-mentioned formula (III) is preferably an aralkenylene group with 8 to 30 (more preferably 8 to 20) carbon atoms, and the specific examples include 2-phenyl-1,1-ethenylene group, 1-phenyl-1,2-ethenylene group, 1-phenyl-1,2-(1-propenylene) group, 1,3-(1-propenylene) group, 1-phenyl-1,4-(1-butenylene) group, 1-phenyl-1,4-(2-butenylene) group, 1-phenyl-1,5-(1-pentenylene) group, 1-phenyl-1,6-(1-hexenylene) group, 1-phenyl-1,12-(1-dodecenylene) group, or the like.

The substituted aralkenylene group as $R^3$ in the above-mentioned formula (III) is preferably an aralkenylene group with 8 to 30 (more preferably 8 to 20) carbon atoms which is substituted with a halogen atom, a hydroxyl group, an alkoxy group, a phenoxy group, an amino group, a substituted amino group, an alkoxycarbonyl group, an aminocarbonyl group, a nitrile group, or the like, and the specific example include 4-chlorophenyl-1,2-ethenylene group, 4-methoxyphenyl-1,2-ethenylene group, or the like.

The unsubstituted alkynylene group as $R^3$ in the above-mentioned formula (III) is preferably an alkynylene group with 2 to 30 (more preferably 2 to 20) carbon atoms, and the specific examples include ethenylene group, 1,3-(1-propynylene) group, 3,3-(1-propynylene) group, 1,4-(1-butynylene) group, 1,5-(1-pentynylene) group, 1,6-(1-hexynylene) group, 1,12-(1-dodecynylene) group, 1,18-(1-octadecynylene) group, or the like.

The substituted alkynylene group as $R^3$ in the above-mentioned formula (III) is preferably an alkynylene group with 2 to 30 (more preferably 2 to 20) carbon atoms which is substituted with a halogen atom, a hydroxyl group, an alkoxy group, a phenoxy group, an amino group, a substituted amino group, an alkoxycarbonyl group, an aminocarbonyl group, a nitrile group, or the like, and the specific examples include 3-chloro-1,3-(1-propynylene) group, 3,3-difluoro-1,3-(1-propynylene) group, or the like.

The unsubstituted aralkynylene group as $R^3$ in the above-mentioned formula (III) is preferably an alkynylene group with 8 to 30 (more preferably 8 to 20) carbon atoms, and the specific examples include 3-phenyl-1,3-(1-propynylene) group, 3-phenyl-1,4-(1-butynylene) group, or the like.

The substituted aralkynylene group as $R^3$ in the above-mentioned formula (III) is preferably an aralkynylene group with 8 to 30 (more preferably 8 to 20) carbon atoms which is substituted with a halogen atom, a hydroxyl group, an alkoxy group, a phenoxy group, an amino group, a substituted amino group, an alkoxycarbonyl group, an aminocarbonyl group, a nitrile group, or the like, and the specific examples include 3-(4-chlorophenyl)-1,3-(1-propynylene) group, 3-(4-methoxyphenyl)-1,3-(1-propynylene) group, or the like.

$R^3$ in the above-mentioned formula (III) is preferably an unsubstituted alkylene group with 1 to 30 carbon atoms, a substituted alkylene group with 1 to 30 carbon atoms, an aralkylene group with 7 to 30 carbon atoms, or an alkenylene group with 2 to 30 carbon atoms, and is more preferably an alkylene group with 1 to 25 carbon atoms or an alkenylene group with 2 to 20 carbon atoms, and is even more preferably an alkylene group with 1 to 20 carbon atoms or an alkenylene group with 2 to 10 carbon atoms.

T in the above-mentioned formulae (II) and (III) is —CO—, —CONH—, or —SO$_2$—, preferably —CO— or —CONH—, and more preferably —CO—.

Q in the above-mentioned formulae (II) and (III) is —O—, —CO—, —SO$_2$—, —OCO—, —NHCO—, or —OSi(CH$_3$)$_2$—, preferably —O—, —CO—, —OCO—, —NHCO—, or —OSi(CH$_3$)$_2$—, more preferably —O—, —CO—, or —NHCO—, and even more preferably —O— or —CO—.

The symbols b, c, d, and e in the above-mentioned formulae (II) and (III) are each 1 or 0, and at least one of c, d, and e is 1. The symbol b is preferably 1. The symbols d and e are each preferably 1.

The block copolymer in the present invention contains one or more block structural units represented by the formula (I) and one or more structural units represented by the formula (II) and/or the formula (III) in a molecule. The content of the block structural unit represented by the above-mentioned formula (I) is preferably 1 to 1,000 units, more preferably 1 to 100 units, and even more preferably 1 to 50 units in a molecule in the block copolymer in the present invention. The content of the structural units represented by the formula (II) and/or formula (III) is preferably 1 to 100,000 units, more preferably 1 to 10,000 units, and even more preferably 1 to 1,000 units in a molecule. Moreover, the block copolymer may contain two or more types of block structural units represented by the formula (I) and each two or more types of structural units represented by the formula (II) and/or formula (III).

The block copolymer in the present invention may be used as a mixture with a polymer having structural units represented by the above-mentioned formula (I) or with a polymer represented by the above-mentioned formula (II) and/or formula (III).

(2) Graft Polymer

The (2,5-disubstituted-1,4-phenylene oxide) graft polymer according to the present invention means a polymer which comprises one or more structural units represented by the formula (IV), or three or more of structural unit of the formula (IV) and structural unit of the formula (V), in a molecule.

The above-mentioned formula (IV) has the structural unit represented by the above-mentioned formula (I), and the specific and preferable examples of $R^1$ and a in this structural unit are the same as those in the above-mentioned formula (I).

The trifunctional unsubstituted hydrocarbon group as $R^4$ in the above-mentioned formula (IV) is preferably a trifunctional group with 1 to 30 (more preferably 1 to 20) carbon atoms and the specific examples include groups such

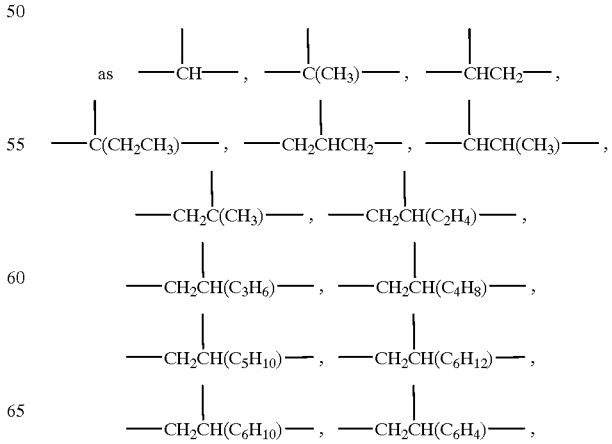

-continued

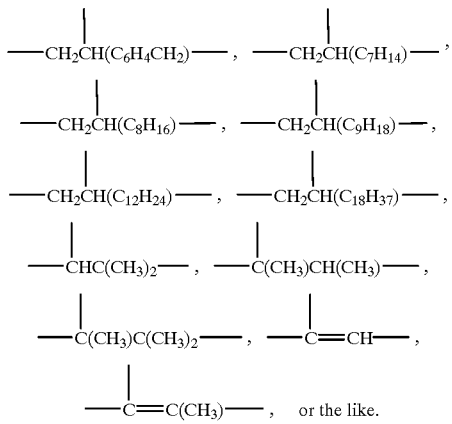

The trifunctional substituted hydrocarbon group as $R^4$ in the above-mentioned formula (IV) is preferably a trifunctional group with 1 to 30 (more preferably 1 to 20) carbon atoms substituted with a halogen atom, a hydroxyl group, an alkoxy group, a phenoxy group, an amino group, a substituted amino group, an alkoxycarbonyl group, an aminocarbonyl group, a nitrile group, or the like, and the specific examples include groups such as

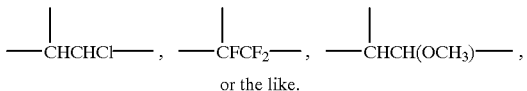

or the like.

$R^4$ in the above-mentioned formula (IV) is preferably a trifunctional hydrocarbon group, more preferably groups such as

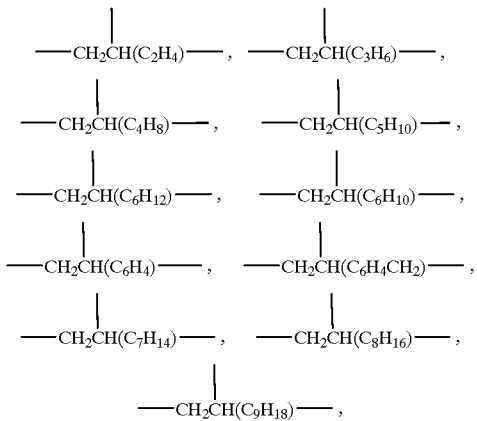

and even more preferably groups such as

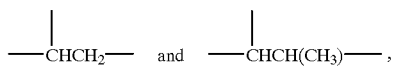

U in the above-mentioned formula (IV) is —CO—, —OCO—, or —NHCO—, preferably —CO— or —NHCO—, and more preferably —CO—. The symbol f is 1 or 0, preferably 1.

Specific and preferable examples of $R^5$ in the above-mentioned formula (V) are the same as those of $R^4$ in the above-mentioned formula (IV).

The halogen atom as $R^6$ in the above-mentioned formula (V) represents a fluorine atom, a chlorine atom, a bromine atom, or an iodine atom, and among them, a fluorine atom or a chlorine atom is preferable.

Specific and preferable examples of the unsubstituted hydrocarbon group and substituted hydrocarbon group in the above-mentioned formula (V) are the same as those of $R^8$ in the above-mentioned formula (XI).

W in the above-mentioned formula (V) represents —O—, —CO—, —CO$_2$—, —OCO—, or —CONH—, preferably —O—, —CO$_2$—, or —CONH—, more preferably —O— or —CO$_2$—, and even more preferably —CO$_2$—.

The graft polymer in the present invention comprises one or more structural units represented by the formula (IV), or three or more of structural unit of the formula (IV) and structural unit of the formula (V), in a molecule. The content of the structural units represented by the formula (IV) is preferably 1 to 100,000 units, more preferably 1 to 10,000 units, even more preferably 1 to 1,000 units, and especially preferably 1 to 100 units, in a molecule. The content of the structural units represented by the formula (IV) and/or the formula (V) is preferably 3 to 1,000,000 units, more preferably 1 to 100,000 units, even more preferably 1 to 10,000 units, and especially preferably 1 to 1,000 units, in a molecule. The graft polymer may contain two or more types of structural units represented by the above-mentioned formula (IV) and may contain two or more types of structural units represented by the above-mentioned formula (V), in a molecule.

The graft polymer in the present invention may be used as a mixture with a polymer having structural units represented by the above-mentioned formula (I) or with a polymer represented by the above-mentioned formula (V), and furthermore, may be used as a mixture with the block copolymer of the present invention or with a polymer represented by the above-mentioned formula (II) and/or the formula (III).

Although no specific limitation is imposed on the shape of the polymer of the present invention, the polymer is preferably a powder with an average particle diameter of 5 mm or less and is more preferably a powder with an average particle diameter of 2 mm or less.

Although no specific limitation is imposed on the crystallinity of the polymer of the present invention, the polymer preferably shows an exothermic peak (crystallization peak) of 5 J/g or more at 150° C. or more when cooled after being melted, and/or shows an endothermic peak (crystalline melting peak) of 5 J/g or more at 150° C. or more when re-heated after the melted polymer is cooled.

The crystallization peak and crystalline melting peak of the polymer are measured as follows. In differential scanning calorimetry carried out under argon atmosphere, the polymer is heated from room temperature to a temperature at which it completely melts (complete melting temperature) at a rate of 10° C./min, kept at the complete melting temperature for 5 minutes, cooled from the complete melting temperature to room temperature at a rate of 10° C./min to check whether an exothermic peak (crystallization peak) of 5 J/g or more is present at 150° C. or more. Subsequently, the polymer is heated again from room temperature to the complete melting temperature at a rate of 10° C./min to check whether an endothermic peak (crystalline melting peak) of 5 J/g or more is present at 150° C. or more.

The crystallization peak temperature of the polymer when cooled after melting is preferably 180° C. or more, more preferably 200° C. or more, and even more preferably 220° C. or more. The quantity of heat for crystallization peak is preferably 6 J/g or more, more preferably 7 J/g or more, and even more preferably 10 J/g or more.

The melting peak temperature of the polymer when re-heated after melting and cooling of the polymer is preferably 200° C. or more, more preferably 240° C. or more, and even more preferably 270° C. or more. The quantity of heat for melting peak is preferably 6 J/g or more, more preferably 7 J/g or more, and even more preferably 10 J/g or more.

More preferably, the polymer of the present invention is substantially free from gel substance. The polymer is confirmed to be free from gel substance, for example, when 1 mg of the polymer is dissolved in 1 ml of 1,2-dichlorobenzene at 150° C. "Substantially free from gel substance" means that the polymer preferably contains 5% by weight or less, more preferably 2% by weight or less of gel substance, and the polymer most preferably contains no gel substance.

Although no specific limitation is imposed on the molecular weight of the polymer of the present invention, the number average weight is preferably 500 to 1,000,000, more preferably 1,000 to 200,000, and even more preferably 2,000 to 100,000.

(3) Preparation Method of Copolymers

Preparation methods of the block copolymer of the present invention will be described hereinafter.

Although no specific limitation is imposed on the preparation method of the block copolymer of the present invention, it is preferable to synthesize a polymer having block structural units represented by the formula (I) and then copolymerize the polymer with at least one of structural units represented by the formula (II) or the formula (III).

Although no specific limitation is imposed on the synthesis method of the polymer having block structural units represented by the formula (I), it is preferable to subject a 2,5-disubstituted phenol represented by the following formula (XII) to oxidative polymerization in the presence of a copper complex catalyst comprising a tridentate ligand having nitrogen atoms as coordinating atoms and a copper atom, and in the presence of oxygen. The catalyst and the reaction conditions may be used according to the method described in Japanese Patent Application No.2000-25621.

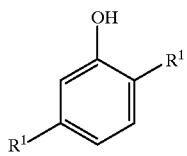

(XII)

(wherein $R^1$ has the same meaning as that in the above-mentioned formula(I))

Specific examples and preferable groups of $R^1$ in the above-mentioned formula (XII) are the same as those in the above-mentioned formula (I).

Preparation methods of the above-mentioned block structural unit (polymer) will be described hereinafter.

A tridentate ligand in a copper complex catalyst means a tridentate ligand whose coordinating atoms are nitrogen atoms. The ligand means a molecular or an ion that is bonded to a certain atom by coordination bond, as described in Kagakudaijiten (1st ed., Tokyo Kagaku Dojin, 1989). The atom directly involved in the bond is called a coordinating atom. The tridentate ligand is a ligand having three coordinating atoms.

No specific limitation is imposed on the tridentate ligand used in the above-mentioned copper complex catalyst, provided that the coordinating atoms are nitrogen atoms. Specific examples of such a tridentate ligand include diethylene triamine, bis(2-pyridylmethyl)amine, bis(2-pyridylethyl)amine, bis(2-imidazolylmethyl)amine, bis(2-oxazolylmethyl)amine, bis(2-thiazolylmethyl)amine, N-(2-pyridylmethylidene)-N-(2-pyridylmethyl)amine, 2,2':6',2"-terpyridine, 3-(2-pyridylmethylimino)-2-butanoneoxime, tris(2-pyridyl)methane, tris(2-imidazolyl)methane, tris(1-pyrazolyl)methane, tris(1-pyrazolyl)phosphate, tris(1-pyrazolyl)borate, 1,4,7-triazacyclononane, and derivatives thereof.

The valence of the copper atom in the copper complex catalyst is 0 to 3, preferably 1 or 2. In the copper complex catalyst, no specific limitation is imposed on the ratio of the tridentate ligand and the copper atom, but one or more copper atoms are preferable, one to three copper atoms are more preferable, and one copper atom is further preferable, per tridentate ligand, as a substantially formed complex.

The copper complex catalyst can be used in an arbitrary amount. In general, the copper complex catalyst is preferably used at 0.001 to 50 mol %, more preferably 0.01 to 10 mol %, calculated as the amount of copper to the phenolic starting material.

The oxidant in oxidative polymerization reaction in preparation of the block structural unit is generally oxygen, which may be a mixture with an inert gas or may be air. Oxygen is usually used in large excess above the equivalent, to the phenolic starting material. Oxidative polymerization can be conducted in the absence of a reaction solvent, but usually a solvent is preferably used.

No specific limitation is imposed on the reaction temperature in oxidative polymerization, provided that the reaction medium remains fluid. When no solvent is used, a temperature equal to or above the melting point of the phenolic starting material is necessary. The preferable temperature range is 0° C. to 200° C., more preferably 0° C. to 150° C., and even more preferably 0° C. to 100° C. The preferable reaction temperature is 10° C. to 60° C. in view of energy saving. The reaction time varies depending on the conditions such as the amount of the catalyst and the reaction temperature, but the reaction time is generally 1 hours or more, preferably 3 to 300 hours.

The polymer having block structural units represented by the formula (I) may be obtained by oxidative polymerization of a 2,5-disubstituted phenol represented by the above-mentioned formula (XII) which may be used alone, or in combination with one another, or as a mixture with a phenol represented by the following formula (XIII) and/or a bisphenol (XIV) represented by the following formula (XIV).

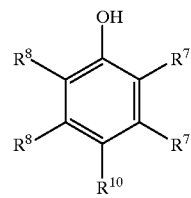

(XIII)

(wherein $R^7$ and $R^8$ each have the same meanings as those in the above-mentioned formula (X), and $R^{10}$ is a hydrogen atom, a phenoxy group, an unsubstituted hydrocarbon group, or a substituted hydrocarbon group.)

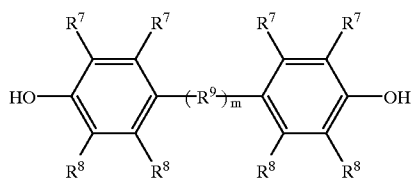

(XIV)

(wherein $R^7$ to $R^9$ and m each have the same meanings as those in the above-mentioned formula (XI).)

Specific examples and preferable groups for $R^7$ and $R^8$ in the above-mentioned formula (XIII) are the same as those in the above-mentioned formula (X).

$R^{10}$ in the above-mentioned formula (XIII) is preferably a hydrogen atom, a phenoxy group, or a hydrocarbon group with 1 to 20 carbon atoms, more preferably a hydrogen atom, a phenoxy group, or a hydrocarbon group with 1 to 6 carbon atoms, and even more preferably a hydrogen atom or a phenoxy group.

Specific examples and preferable groups for $R^7$ to $R^9$ in the above-mentioned formula (XIV) are the same as those in the above-mentioned formula (XI).

When a 2,5-disubstitutied phenol represented by the above-mentioned formula (XII) is used in combination with a phenol represented by the above-mentioned formula (XIII) and/or a bisphenol represented by the above-mentioned formula (XIV), the ratio of each component is appropriately determined, provided that the properties of the desired polymer is not impaired, but the combination ratio of the 2,5-disubstitutied phenol is preferably 80 mol % or more, more preferably 90 mol % or more, and even more preferably 95 mol % or more, based on the total phenol monomers.

When a 2,5-disubstitutied phenol represented by the above-mentioned formula (XII) and/or a phenol represented by the above-mentioned formula (XIII) are subjected to oxidative polymerization, the polymer having block structural units represented by the formula (I) generally has a hydroxyl group only at one terminal in its molecule. On the other hand, a 2,5-disubstitutied phenol represented by the above-mentioned formula (XII) and/or a phenol represented by the above-mentioned formula (XIII) are subjected to oxidative polymerization in combination with a bisphenol represented by the above-mentioned formula (XIV), the polymer having block structural units represented by the formula (I) has structural units represented by the above-mentioned formula (XI) and generally has hydroxyl groups at both terminals in its molecule.

When a polymer having block structural units represented by the formula (I) is reacted with a carbonyl compound represented by $R^{11}$—CO—$R^{12}$ or a halogen compound represented by X—$R^{13}$—X (wherein $R^{11}$ and $R^{12}$ each represent a hydrogen atom, an unsubstituted hydrocarbon group, or a substituted hydrocarbon group; $R^{13}$ represents a divalent unsubstituted-hydrocarbon group or a divalent substituted-hydrocarbon group; and X represents a halogen atom such as chlorine, bromine, and iodine; specific examples and preferable groups for $R^{11}$ and $R^{12}$ are the same as those for $R^8$ in the above-mentioned formula (XI); specific examples and preferable groups for $R^{13}$ are the same as those for $R^9$ in the above-mentioned formula (XI) excluding an oxygen atom.), a polymer having —C($R^{11}R^{12}$)— and —$R^{13}$— linkages and generally having hydroxyl groups at both terminals in its molecule can be obtained. No specific limitation is imposed on the reaction conditions of this method, and 0.5 or more equivalents of the carbonyl compound and the halogen compound are reacted, to the polymer having block structural units represented by the formula (I).

In the production of the block copolymer of the present invention, no specific limitation is imposed on the method to copolymerize so that at least one of the structural units represented by the formula (II) or the formula (III) is incorporated, the following method is preferable.

The first embodiment of block copolymerization is a method, in which a polymer having block structural units represented by the formula (I) is reacted with a halogen compound, such as XCO—$R^2$—O—CH$_3$, XCO—$R^2$—COX, X—$R^3$—H, X—$R^3$—O—CH$_3$, XCO—$R^3$—H, XCO—$R^3$—O—CH$_3$, XCO—$R^3$—COX, X—O$_2$S—$R^2$—SO$_2$—X, X—O$_2$S—$R^3$—SO$_2$—X, or X—CO—X; or a cyclic acid anhydride represented by the following structural formula (XV) or (XVI) (wherein $R^2$ has the same meaning as that in the formula (II); $R^3$ has the same meaning as that in the formula (III); and X represents a halogen atom such as chlorine, bromine, or iodine.).

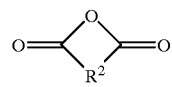

(XV)

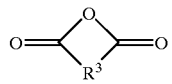

(XVI)

No specific limitation is imposed on the reaction conditions for reacting the above-mentioned halogen compound or cyclic acid anhydride, and halogen atoms in the halogen compound, or the cyclic acid anhydride may be reacted at an equimolar amount or more, to the amount of the polymer having block structural units represented by the formula (I). When the above-mentioned halogen compound or the cyclic acid anhydride is reacted in the presence of a base such as a tertiary amine, the halogen compound or the cyclic acid anhydride generally reacts with a terminal hydroxyl group of the polymer having block structural units represented by the formula (I). On the other hand, when reacting in the presence of a Lewis acid such as aluminum chloride, the halogen compound or the cyclic acid anhydride generally reacts with an aromatic group at one terminal of the polymer having block structural units represented by the formula (I).

The second embodiment for preparing a block copolymer is a method, in which the polymer having block structural units represented by the formula (I) is reacted with a carboxylic acid, such as HO—CO—$R^2$—O—CH$_3$, HO—CO—$R^2$—CO—OH, HO—CO—$R^3$—H, HO—CO—$R^3$—O—CH$_3$, or HO—CO—$R^3$—CO—OH, a carboxylate, such as R—O—CO—$R^2$—O—CH$_3$, R—O—CO—$R^2$—CO—O—R, R—O—CO—$R^3$—H, R—O—CO—$R^3$—O—CH$_3$, or R—O—CO—$R^3$—CO—O—R, or an isocyanate compound, such as OCN—$R^2$—O—CH$_3$, OCN—$R^2$—NCO, OCN—$R^3$—H, OCN—$R^3$—O—CH$_3$, or OCN—$R^3$—NCO (wherein $R^2$ has the same meaning as that in the formula (II), and $R^3$ has the same meaning as that in the formula (III).). No specific limitation is imposed on the reaction conditions of this method, and the carboxylic acid compound, the carboxylate compound, or the isocyanate compound may be reacted at an equimolar amount or more, to the amount of the hydroxyl groups in the polymer having block structural units represented by the above-mentioned formula (I). The carboxylic acid compound, the carboxylate compound, or the isocyanate compound generally reacts with the terminal hydroxyl group of the polymer having block structural units represented by the formula (I).

The third embodiment for preparing a block copolymer is a method, in which an oxycarbonyl compound, such as YCO—$R^2$—OZ or YCO—$R^3$—OZ (wherein $R^2$ has the same meaning as that in the formula (II); $R^3$ has the same meaning as that in the formula (III); Y represents a hydroxyl group, or a halogen atom, such as chlorine, bromine, or iodine; and Z represents a hydrogen atom or a $CH_3CO$— group.), a cyclic ester compound represented by the following structural formula (XVII), or a cyclic ether compound represented by the following structural formula (XVIII) is polymerized, in the presence of the polymer having block structural units represented by the above-mentioned formula (I). No specific limitation is imposed on the reaction conditions of this method, an excess molar amount of the oxycarbonyl compound, the cyclic ester compound, or the cyclic ether compound may be polymerized, to the hydroxyl groups of the polymer having block structural units represented by the above-mentioned formula (I).

A homopolymer of the oxycarbonyl compound, the cyclic ester compound, or the cyclic ether compound, and the polymer having block structural units represented by the above-mentioned formula (I) may be reacted, to obtain a corresponding block copolymer.

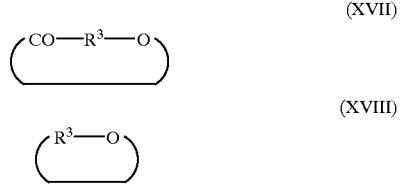

(wherein $R^3$ has the same meaning as that in the formula (III).)

In any of the above-mentioned three embodiments, the reaction temperature is preferably 30 to 350° C., more preferably 60 to 150° C., and the reaction time is preferably 0.1 hours to 500 hours, more preferably 1 hour to 48 hours. The reaction molar ratio can be appropriately determined according to the ratio of the polymer having block structural units represented by the formula (I) and the structural units represented by the formula (II) or (III) in the desired block copolymer.

Preparation methods of the graft polymer of the present invention will be described hereinafter.

No specific limitation is imposed on the preparation method of the graft polymer of the present invention, and the unsaturated bond parts in the block copolymer represented by the formula (XIX) may be polymerized or the block copolymer represented by the formula (XIX) may be copolymerized with a component represented by the formula (XX) to synthesize the graft polymer.

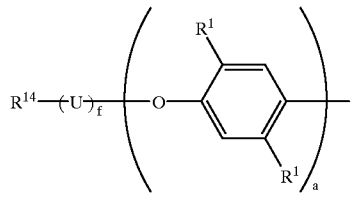

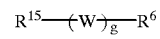

(wherein $R^1$, U, a and f are defined as in the formula (IV), and $R^6$, W, and g are defined as in the formula (IV). $R^{14}$ and $R^{15}$ each represents an unsubstituted alkenyl group, a substituted alkenyl group, an unsubstituted aralkenyl group, a substituted aralkenyl group, an unsubstituted alkynyl group, a substituted alkynyl group, an unsubstituted aralkynyl group, or a substituted aralkynyl group.)

Specific examples and preferable examples of $R^1$, U, a, and f in the above-mentioned formula (XIX) are the same as those in the formula (IV). Specific examples and preferable examples of $R^6$, W, and g in the above-mentioned formula (XX) are the same as those in the formula (IV).

The unsubstituted alkenyl group, the substituted alkenyl group, the unsubstituted aralkenyl group, the substituted aralkenyl group, the unsubstituted alkynyl group, the substituted alkynyl group, the unsubstituted aralkynyl group, and the substituted aralkynyl group as $R^{14}$ in the above-mentioned formula (XIX) and $R^{15}$ in the above-mentioned formula (XX) are the same as those for $R^3$ in the formula (III).

No specific limitation is imposed on the reaction conditions of the graft polymerization, and the reaction may be carried out in the presence of an appropriate radical initiator and a reaction solvent. The reaction temperature is preferably 30 to 350° C., more preferably 60 to 150° C., and the reaction time is preferably 0.1 to 500 hours, more preferably 1 hour to 48 hours. Moreover, the reaction mol ratio can be appropriately determined according to the ratio of the structural units represented by the formula (IV) and the formula (V) in the desired graft polymer.

The resin composition includes the above-mentioned block or graft polymer that may further contain an ordinary polymer that is not the block or graft polymer. The resin composition of this invention may be the graft polymer which comprises one or more structural units represented by the following formula (IV), or that comprising three or more structural units of the following formula (IV) and structural unit of the following formula (V), in a molecule. The resin composition is not particularly limited in this invention. In the resin composition, average value of number of structural unit represented by the formula (IV), per polymer molecule, is preferably 0.04 unit or more, more preferably 0.1 unit or more, particularly preferably 0.3 unit or more. The sum of number of the structural units represented by the formula (IV) or the formula (V) is preferably 10 units or more per molecule on average, though not particularly limited in this invention.

The block copolymer and graft polymer of the present invention may be used alone or as a composition with the block copolymer and the graft polymer. Specific examples of polymer components of the composition include a polymer having structural units represented by the above-mentioned formula (I), a polymer having structural units represented by the above-mentioned formula (II) and/or formula (III), a polymer having structural units represented by the above-mentioned formula (IV), a polymer having structural units represented by the above-mentioned formula (V); polyolefins such as a polyethylene, a polypropylene, a polystyrene, a polyvinyl chloride, a polymethyl methacrylate, a polyvinyl acetate, a polyacrylonitrile, and copolymers thereof; polyethers such as a polyoxymethylene, a polyphenylene oxide, a poly(2,6-dimethyl-1,4-phenylene oxide), and copolymers thereof; polyesters such as a polyethylene terephthalate, a polybutylene terephthalate, a poly(ethylene-2,6-dinaphthalate), a poly(4-oxybenzoate), a poly(2-oxy-6-naphthalate), and copolymers thereof; polyamides such as nylon 6 and nylon 66 (trade names); polycarbonates; polyphenylenesulfides; polysulfones; polyethersulfones; polyether etherketones; polyimides; polyetherimides and thermosetting polymers such as phenol resins, urea resins, melamine resins, and epoxy resins. Specific examples of reformers for the composition include stabilizers such as 2,6-di-t-butylphenol derivatives and 2,2,6,6-tetramethylpiperidine derivatives; flame retardants such as polyhalogenated compounds and phosphates; surfactants; and rheology modifiers.

The (2,5-disubstituted-1,4-phenylene oxide) block copolymer and the (2,5-disubstituted-1,4-phenylene oxide) graft polymer, of the present invention, can increase the molecular weight of poly(2,5-disubstituted-1,4-phenylene oxide). It is expected that these copolymers further improve mechanical strength and impact strength of molded articles produced therefrom and are useful as raw materials for injection molding and materials for use as film.

Hereinafter the present invention will be explained in further detail based on examples. The present invention is not limited to the following examples in the range not departing from the scope of the claims.

EXAMPLES (i) Analysis

Conversion of monomers (Conv.): 15 mg of a reaction mixture containing diphenylether as an internal standard substance was sampled, and a small amount of concentrated hydrochloric acid was added to render the mixture acidic, and 2 g of methanol was added thereto to obtain a test sample. The sample was analyzed on a high performance liquid chromatograph (pump: SC8020 system, trade name, manufactured by Tosoh Corporation, detector: PD-8020, trade name, manufactured by Tosoh Corporation, detection wavelength: 278 nm, column: ODS-AM manufactured by YMC, developing solvent: starting with a methanol/water ratio of 68:32 and gradually changed to 100:0 after 38 minutes and kept at the ratio till 50 minutes) to determine the conversion of the monomer by using diphenylether as an internal standard substance.

Presence or absence of gel substance: 1 mg of polymer is added to 1 ml of 1,2-dichlorobenzene (referred to as oDCB) and heated to 150° C. to check if gel substance as insoluble substance is present.

Number average molecular weight (Mn) and weight average molecular weight (Mw) of the polymer: Polymer was analyzed by gel permeation chromatography to determine the weight average molecular weight (Mw) and the number average molecular weight (Mn) of the polymer based on standard polystyrene. The analysis was carried out by using PL-GPC210 system, trade name, manufactured by Polymer Laboratories with three columns of Plgel 10 um MIXED-B, trade name, manufactured by Polymer Laboratories and oDCB (containing 0.01% w/v of 2,6-di-t-butyl-4-methylphenol) as a developing solvent at 140° C.

Crystallization temperature (Tc) and quantity of heat for crystallization (Hc), after melting of polymer, and melting temperature (Tm) and quantity of heat for melting (Hm): Scanning differential calorimetry (by using DSC3200S, trade name, manufactured by MAC SCIENCE) was carried out under argon atmosphere in the following methods.

Measurement Example 1

When sample was heated from room temperature to 350° C. at 10° C./min, kept at the temperature for 5 minutes, and cooled from 350° C. to room temperature at a rate of 10° C./min, and an exothermal peak of 5 J/g or more at 150° C. or more was found, the temperature at the peak top was taken as the crystallization temperature (Tc) and the peak area was taken as the quantity of heat for crystallization (Hc). When the sample was were heated again from room temperature to 350° C. at 10° C./min, and an endothermal peak of 5 J/g or more at 150° C. or more was found, the temperature at the peak top was taken as the melting temperature (Tm) and the peak area was taken as the quantity of heat for melting (Hm).

Measurement Example 2

When sample was heated from room temperature to 320° C. at 10° C./min, kept at the temperature for 5 minutes, and cooled from 320° C. to room temperature at 10° C./min, and an exothermal peak of 5 J/g or more at 150° C. or more was found, the temperature at the peak top was taken as the crystallization temperature (Tc) and the peak area was taken as the quantity of heat for crystallization (Hc). When the sample was were heated again from room temperature to 320° C. at 10° C./min, and an endothermal peak of 5 J/g or more at 150° C. or more was found, the temperature at the peak top was taken as the melting temperature (Tm) and the peak area was taken as the quantity of heat for melting (Hm).

(ii) Synthesis of Block Structural Unit

Reference Example 1

An oxygen-filled 2-liter rubber balloon was fixed to 500-ml three-necked round-bottom flask equipped with a stirrer to purge the flask with oxygen. Into this flask, 0.85 mmol of $Cu(Cl_2)$ (1,4,7-triisopropyl-1,4,7-triazacyclononane) (see J. Am. Chem. Soc.,120,8529, (1998), referred to as Cu(tacn)) was placed and 85 mmol of 2,5-dimethylphenol and a solution of 8.5 mmol of 2,6-diphenylpyridine in 170 g of toluene as a base were added. The mixture was kept at 40° C. and vigorously stirred. After 96 hours, several drops of concentrated hydrochloric acid were added to render the mixture acidic, and 1,200 ml of methanol was added, and precipitated polymer was obtained by filtration. The precipitate was washed with 100 ml of methanol three times and dried under reduced pressure at 60° C. for 6 hours to obtain a polymer (yield: 73.1%).

The obtained polymer contained no gel substance. The Mn of the polymer was 2,700 and the Mw was 11,500. The degree of polymerization was 22.5. The polymer was dissolved in 1,2-dichlorobenzene-$d_4$ and subjected to NMR analysis (LA600, trade name, manufactured by JEOL) at 140° C. to find peaks at 2.17 ppm (6H) and 6.72 ppm (2H) in the $^1$H NMR spectrum (600 MHz) and 15.6 ppm, 120.3 ppm, and a 2,5-dimethyl-1,4-phenylene oxide structure (the homopolymer is referred to as 2,5-DMPO). The results of differential scanning calorimetry of the polymer are shown in Table 1.

Reference Example 2

An oxygen-filled 2-liter rubber balloon was fixed to a 500-ml three-necked round-bottom flask equipped with a stirrer to purge the flask with oxygen. Into this flask, 0.85 mmol of Cu(tacn) was placed and 85 mmol of 2,5-dimethylphenol and a solution of 8.5 mmol of 2,6-diphenylpyridine in 170 g of toluene as a base were added. The mixture was kept at 40° C. and vigorously stirred. After 96 hours, several drops of concentrated hydrochloric acid were added to render the mixture acidic, and 1,200 ml of methanol was added, and precipitated polymer was obtained by filtration. The precipitate was washed with 100 ml of methanol three times and dried under reduced pressure at 60° C. for 6 hours, and the obtained polymer was dispersed in 170 g of toluene and stirred, and toluene insoluble substance was collected by centrifugal separation and washed with 100 ml of methanol three times and dried under reduced pressure at 60° C. for 6 hours to obtain a polymer (yield: 54.2%).

The obtained polymer contained no gel substance. The Mn of the polymer was 2,400 and the Mw was 10,400. The degree of polymerization was 20.0. The polymer was dissolved in 1,2-dichlorobenzene-$d_4$ and subjected to NMR analysis (LA600 manufactured by JEOL) at 140° C. to find peaks at 2.17 ppm (6H) and 6.71 ppm (2H) in the $^1H$ NMR spectrum (600 MHz) and 15.6 ppm, 120.3 ppm, and 151.1 ppm (the other peak overlapped with the peak of 1,2-dichlorobenzene-$d_4$) in $^{13}C$ NMR spectrum (150 MHz). The results of the NMR analysis confirmed that the polymer had a 2,5-dimethyl-1,4-phenylene oxide structure (the homopolymer is referred to as 2,5-DMPO). The results of differential scanning calorimetry of the polymer are shown in Table 1.

(iii) Block Copolymerization

Example 1

A cooling tube fitted with an argon inlet was fixed to a 50-ml two-necked round-bottom flask equipped with a magnetic stirrer to purge the flask with argon. Into this flask, 200 mg of 2,5-DMPO, which was obtained in the above-mentioned Reference example 1, and a solution of 6.56 mmol of 2,6-dimethylpyridine as a base in 20 g of 1,2-dichlorobenzene were added. The mixture was kept at 140° C. to dissolve 2,5-DMPO, and then cooled to 130° C. A solution of 3.28 mmol of anisic chloride in 5 g of 1,2-dichlorobenzene was dropped slowly into this solution and the mixture was vigorously stirred for 24 hours. After 24 hours, the reaction solution was concentrated, and 200 ml of methanol was added, and precipitated polymer was obtained by filtration. The precipitate was washed with 10 ml of methanol three times and dried under reduced pressure at 60° C. for 6 hours to obtain a polymer.

The analysis results of the polymer are shown in Table 1. The polymer was dissolved in 1,2-dichlorobenzene-$d_4$ and subjected to NMR analysis (LA600 manufactured by JEOL) at 120° C. to find peaks at 2.00 ppm (6H), 3.51 ppm (3H), 6.69 ppm (2H,s), and 7.95 ppm (2H) in the $^1H$ NMR spectrum (600 MHz). These results showed that the polymer had a 2,5-dimethyl-1,4-phenylene oxide structure with its terminal hydroxyl group substituted with an anisate. The ratio of integrated intensities of peaks at 3.51 ppm (3H) and at 2.00 ppm (6H) showed that the number of the anisate group per molecule of 2,5-DMPO was about 1.

Example 2

A cooling tube fitted with an argon inlet was fixed to a 50-ml two-necked round-bottom flask equipped with a magnetic stirrer to purge the flask with argon. Into this flask, 100 mg of 2,5-DMPO, which was obtained in the above-mentioned Reference example 1, and a solution of 3.28 mmol of 2,6-dimethylpyridine as a base in 10 g of 1,2-dichlorobenzene were added. The mixture was kept at 140° C. to dissolve 2,5-DMPO, and then cooled to 130° C. A solution of 1.64 mmol of stearic chloride in 2.5 g of 1,2-dichlorobenzene was dropped slowly into this solution, and the mixture was vigorously stirred for 24 hours. After 24 hours, the reaction solution was concentrated, and 200 ml of methanol was added, and precipitated polymer was obtained by filtration. The precipitate was washed with 10 ml of methanol three times and with 10 ml of diethyl ether three times and dried under reduced pressure at 60° C. for 6 hours to obtain a polymer.

The analysis results of the polymer are shown in Table 1. The polymer was dissolved in 1,2-dichlorobenzene-$d_4$ and subjected to NMR analysis (LA600 manufactured by JEOL) at 120° C. to find peaks at 0.98 ppm (3H), 1.53 ppm (28H), 2.43 ppm (6H), 2.64 ppm (2H), and 6.69 ppm (2H,s) in the $^1H$ NMR spectrum (600 MHz). These results showed that the polymer had a 2,5-dimethyl-1,4-phenylene oxide structure with its terminal hydroxyl group substituted with a stearate. The ratio of integrated intensities of peaks at 2.64 ppm (2H) and at 2.43 ppm (6H) showed that the number of the stearate group per molecule of 2,5-DMPO was about 1.

Example 3

A cooling tube fitted with an argon inlet was fixed to a 50-ml two-necked round-bottom flask equipped with a magnetic stirrer to purge the flask with argon. Into this flask, 200 mg of 2,5-DMPO (corresponding to 0.082 mmol based on the number of the terminal hydroxyl group), which was obtained in the above-mentioned Reference example 1, 0.16 mmol of 2,6-dimethylpyridine, 0.041 mmol of terephthalic dichloride, and 10 g of 1,2-dichlorobenzene were added. The mixture was kept at 140° C. to dissolve 2,5-DMPO, then cooled to 130° C., and vigorously stirred for 72 hours. After 72 hours, 200 ml of methanol was added in portions to the reaction solution, and precipitated polymer was obtained by filtration. The precipitate was washed with 100 ml of methanol and dried under reduced pressure at 60° C. for 6 hours to obtain a polymer.

The analysis results of the polymer are shown in Table 1. The polymer was dissolved in 1,2-dichlorobenzene-$d_4$ and subjected to NMR analysis (LA600 manufactured by JEOL) at 120° C. to find peaks at 2.18 ppm (6H), 6.73 ppm (2H,s), and 8.31 ppm (4H) in the $^1H$ NMR spectrum (600 MHz). These results showed that the polymer was a 2,5-DMPO block polymer having a terephthalic diester unit formed by esterification of the hydroxyl groups of two 2,5-DMPOs and terephthalic dichloride.

Example 4

A cooling tube fitted with an argon inlet was fixed to a 50-ml two-necked round-bottom flask equipped with a magnetic stirrer to purge the flask with argon. Into this flask, 200 mg of 2,5-DMPO (corresponding to 0.082 mmol based on the number of the terminal hydroxyl group), which was obtained in the above-mentioned Reference example 1, and 0.16 mmol of 2,6-dimethylpyridine, 0.041 mmol of 1,12-dodecanoic dichloride, and 10 g of 1,2-dichlorobenzene were added. The mixture was kept at 140° C. to dissolve 2,5-DMPO, then cooled to 130° C., and vigorously stirred for 72 hours. After 72 hours, 200 ml of methanol was added in portions to the reaction solution, and precipitated polymer was obtained by filtration. The precipitate was washed with 100 ml of methanol and dried under reduced pressure at 60° C. for 6 hours to obtain a polymer.

The analysis results of the polymer are shown in Table 1. The polymer was dissolved in 1,2-dichlorobenzene-$d_4$ and subjected to NMR analysis (LA600 manufactured by JEOL) at 120° C. to find peaks at 1.30 ppm (12H), 2.17 ppm (6H), and 6.71 ppm (2H,s) in the $^1H$ NMR spectrum (600 MHz). These results showed that the polymer was a 2,5-DMPO block polymer having a 1,12-dodecanoic diester unit formed by esterification of the hydroxyl groups of two 2,5-DMPOs and 1,12-dodecanoic dichloride.

Example 5

A cooling tube fitted with an argon inlet was fixed to a 50-ml two-necked round-bottom flask equipped with a magnetic stirrer to purge the flask with argon. Into this flask, 200 mg of 2,5-DMPO, which was obtained in the above-mentioned Reference example 2, and 6.56 mmol of 2,6-dimethylpyridine, and 10 g of 1,2-dichlorobenzene were added. The mixture was kept at 140° C. to dissolve 2,5-DMPO and then cooled to 130° C. To this solution, 3.28 mmol of anisic chloride was slowly dropped, and the mixture was vigorously stirred for 24 hours. After 24 hours, 200 ml of methanol was added in portions to the reaction solution, and precipitated polymer was obtained by filtration. The precipitate was washed with 100 ml of methanol and dried under reduced pressure at 60° C. for 6 hours to obtain a polymer (yield: 100%).

The analysis results of the polymer are shown in Table 1. The polymer was dissolved in 1,2-dichlorobenzene-$d_4$ and subjected to NMR analysis (LA600 manufactured by JEOL) at 120° C. to find peaks at 2.18 ppm (6H), 3.68 ppm (3H), 6.72 ppm (2H,s), and 8.11 ppm (2H) in the $^1$H NMR spectrum (600 MHz). These results showed that the polymer had a 2,5-dimethyl-1,4-phenylene oxide structure with its terminal hydroxyl group substituted with an anisate. The ratio of integrated intensities of peaks at 3.68 ppm (3H) and at 2.18 ppm (6H) showed that the number of the anisate group per molecule of 2,5-DMPO was about 1.

Example 6

A cooling tube fitted with an argon inlet was fixed to a 50-ml two-necked round-bottom flask equipped with a magnetic stirrer to purge the flask with argon. Into this flask, 200 mg of 2,5-DMPO (corresponding to 0.096 mmol based on the number of the terminal hydroxyl group), which was obtained in the above-mentioned Reference example 2, and 6.56 mmol of 2,6-dimethylpyridine, and 10 g of 1,2-dichlorobenzene were added. The mixture was kept at 140° C. to dissolve 2,5-DMPO and then cooled to 80° C. To this solution, 3.28 mmol of methacrylic chloride was slowly dropped and the mixture was vigorously stirred for 24 hours. After 24 hours, 200 ml of methanol was added in portions to the reaction solution, and precipitated polymer was obtained by filtration. It was washed with 100 ml of methanol, 50 ml of toluene, and 50 ml of acetone, and dried under reduced pressure at 60° C. for 6 hours. Subsequently, 10 g of 1,2-dichlorobenzene was added to the resultant polymer and kept at 140° C. to dissolve the polymer. The solution was sufficiently cooled below the boiling point of methanol, and 200 ml of methanol was added in portions and the precipitated polymer was obtained by filtration. The polymer was washed with 100 ml of methanol, 50 ml of toluene, and 50 ml of acetone, and dried under reduced pressure at 60° C. for 6 hours (this operation is shown as reprecipitation purification, which is well known as the operation for purification). This reprecipitation purification was carried out once more to obtain a polymer (yield: 87.1%).

The analysis results of the polymer are shown in Table 1. The polymer was dissolved in 1,2-dichlorobenzene-$d_4$ and subjected to NMR analysis (LA600 manufactured by JEOL) at 120° C. to find peaks at 1.21 ppm (3H), 2.17 ppm (6H), 5.56 ppm, 6.27 ppm (2H), and 6.71 ppm (2H,s) in the $^1$H NMR spectrum (600 MHz). These results showed that the polymer had a 2,5-dimethyl-1,4-phenylene oxide structure with its terminal hydroxyl group substituted with a methacrylate (the polymer is referred to as 2,5-DMPO methacrylate).

Example 7

A cooling tube fitted with an argon inlet was fixed to a 200-ml three-necked round-bottom flask equipped with a magnetic stirrer to purge the flask with argon. Into this flask, 3.0 g of 2,5-DMPO (corresponding to 1.44 mmol based on the number of the terminal hydroxyl group), which was obtained in the above-mentioned Reference example 2, and 98.40 mmol of 2,6-dimethylpyridine, and 150 g of 1,2-dichlorobenzene were added. The mixture was kept at 140° C. to dissolve 2,5-DMPO and then cooled to 80° C. To this solution, 49.20 mmol of methacrylic chloride was slowly dropped and the mixture was vigorously stirred for 24 hours. After 24 hours, 1000 ml of methanol was added in portions to the reaction solution, and precipitated polymer was obtained by filtration. It was washed with 500 ml of methanol, 150 ml of toluene, and 150 ml of acetone, and dried under reduced pressure at 60° C. for 6 hours (yield: 88.8%). Subsequently, 110 g of 1,2-dichlorobenzene was added to 2.0 g of the resultant polymer and kept at 140° C. to dissolve the polymer. The solution was sufficiently cooled below the boiling point of methanol, and 200 ml of methanol was added in portions and the precipitated polymer was obtained by filtration. The polymer was washed with 100 ml of methanol, 50 ml of toluene, and 50 ml of acetone, and dried under reduced pressure at 60° C. for 6 hours (this operation is shown as reprecipitation purification, which is well known as the operation for purification). This reprecipitation purification was carried out once more to obtain a polymer (yield: 82.6%).

The analysis results of the polymer are shown in Table 1. The polymer was dissolved in 1,2-dichlorobenzene-$d_4$ and subjected to NMR analysis (LA600 manufactured by JEOL) at 120° C. to find peaks at 1.16 ppm (3H), 2.11 ppm (6H), 5.56 ppm, 6.28 ppm (2H), and 6.72 ppm (2H,s) in the $^1$H NMR spectrum (600 MHz). These results showed that the polymer had a 2,5-dimethyl-1,4-phenylene oxide structure with its terminal hydroxyl group substituted with a methacrylate (the polymer is referred to as 2,5-DMPO methacrylate).

(iv) Graft Copolymerization

Example 8

A cooling tube fitted with an argon inlet was fixed to a 25-ml two-necked round-bottom flask equipped with a magnetic stirrer to purge the flask with argon. Into this flask, 15 mg of 2,5-DMPO methacrylate (corresponding to 0.007 mmol based on the number of the methacrylate), which was obtained in the above-mentioned Example 6, and 1.125 g of 1,2-dichlorobenzene were added. The mixture was kept at 140° C. to dissolve 2,5-DMPO methacrylate and then cooled to 80° C. To this solution, a solution prepared by dissolving 0.6 mmol of methyl methacrylate as a copolymerizable monomer and 0.06 mmol of α,α'-azobisisobutyronitrile as a radical polymerization initiator in 0.2 g of 1,2-dichlorobenzene under argon atmosphere was slowly dropped, and the mixture was vigorously stirred for 24 hours. After 24 hours, 200 ml of methanol was added in portions to the reaction solution, and precipitated polymer was obtained by filtration. The precipitate was washed with 100 ml of methanol and dried under reduced pressure at 60° C. for 6 hours to obtain a polymer (yield: 23.7%).

The analysis results of the polymer are shown in Table 1. The polymer was dissolved in 1,2-dichlorobenzene-$d_4$ and subjected to NMR analysis (LA600 manufactured by JEOL) at 120° C. to find peaks at 1.09 ppm (3H), 2.17 ppm (6H), 3.57 ppm (3H), and 6.71 ppm (2H,s) in the $^1$H NMR spectrum (600 MHz). Moreover, peaks assignable to unreacted 2,5-DMPO methacrylate were found at 5.56 ppm and 6.27 ppm (2H) and the $^1$H NMR measurement results showed that the polymer contained 45 mol % of unreacted 2,5-DMPO methacrylate. Accordingly, 55 mol % of 2,5-DMPO methacrylate underwent radical polymerization. These results showed that the polymer was a copolymer obtained by radical polymerization of 2,5-DMPO methacrylate and the methacryloyl group of methyl methacrylate and the contents of both structural units in the copolymer were found to be 6.2 mol % and 93.8 mol %, respectively.

(v) Graft Copolymerization

Example 9

A cooling tube fitted with an argon inlet was fixed to a 25-ml two-necked round-bottom flask equipped with a magnetic stirrer to purge the flask with argon. Into this flask, 20 mg of 2,5-DMPO methacrylate (corresponding to 0.0096 mmol based on the number of methacrylate), which was obtained in the above-mentioned Example 7, and 1.5 g of 1,2-dichlorobenzene were added. The mixture was kept at 140° C. to dissolve 2,5-DMPO methacrylate and then cooled to 80° C. To this solution, a solution prepared by dissolving 0.8 mmol of phenyl methacrylate as a copolymerizable monomer and 0.08 mmol of α,α'-azobisisobutyronitrile as a radical polymerization initiator in 0.26 g of 1,2-dichlorobenzene under argon atmosphere was slowly dropped, and the mixture was vigorously stirred for 24 hours. After 24 hours, 200 ml of methanol was added in portions to the reaction solution, and the precipitated polymer was obtained by filtration. The precipitate was washed with 100 ml of methanol and dried under reduced pressure at 60° C. for 6 hours to obtain a polymer (yield: 58.0%).

The analysis results of the polymer are shown in Table 1. The resultant polymer was dissolved in 1,2-dichlorobenzene-$d_4$ and subjected to NMR analysis (LA600 manufactured by JEOL) at 120° C. to find peaks at 1.25 ppm (3H), 2.17 ppm (6H), and 6.72 ppm (2H,s) in the $^1$H NMR spectrum (600 MHz). These results of the $^1$H NMR measurement showed that the polymer was a copolymer obtained by radical polymerization of 2,5-DMPO methacrylate and the methacryloyl group of phenyl methacrylate, and the contents of both structural units in the copolymer were found to be 0.4 mol % and 99.6 mol %, respectively.

Example 10

A cooling tube fitted with an argon inlet was fixed to a 25-ml two-necked round-bottom flask equipped with a magnetic stirrer to purge the flask with argon. Into this flask, 100 mg of 2,5-DMPO methacrylate (corresponding to 0.048 mmol based on the number of methacrylate), which was obtained in the above-mentioned Example 7, and 7.5 g of 1,2-dichlorobenzene were added. The mixture was kept at 140° C. to dissolve 2,5-DMPO methacrylate and then cooled to 80° C. To this solution, 13.5 mmol of methyl methacrylate as a copolymerizable monomer was added under argon atmosphere, and a seventh part of a solution prepared by dissolving 0.27 mmol of α,α'-azobisisobutyronitrile as a radical polymerization initiator in 1.33 g of 1,2-dichlorobenzene under argon atmosphere was slowly dropped to initiate the polymerization, and the remaining solution was slowly dropped in six portions, each portion being added every other hour, and the mixture was vigorously stirred for 24 hours. After 24 hours, 200 ml of methanol was added in portions to the reaction solution, and the precipitated polymer was obtained by filtration. The precipitate was washed with 100 ml of methanol and dried under reduced pressure at 60° C. for 6 hours to obtain a polymer (yield: 42.2%).

The analysis results of the polymer are shown in Table 1. The resultant polymer was dissolved in 1,2-dichlorobenzene-$d_4$ and subjected to NMR analysis (LA600 manufactured by JEOL) at 120° C. to find peaks at 1.09 ppm (3H), 1.98 ppm (6H), 3.58 ppm (3H), and 6.71 ppm (2H,s) in the $^1$H NMR spectrum (600 MHz). These results of the $^1$H NMR measurement showed that the polymer was a copolymer obtained by radical polymerization of 2,5-DMPO methacrylate and the methacryloyl group of phenyl methacrylate, and the contents of both structural units in the copolymer were found to be 0.3 mol % and 99.7 mol %, respectively.

Example 11

A cooling tube fitted with an argon inlet was fixed to a 25-ml two-necked round-bottom flask equipped with a magnetic stirrer to purge the flask with argon. Into this flask, 100 mg of 2,5-DMPO methacrylate (corresponding to 0.048 mmol based on the number of methacrylate), which was obtained in the above-mentioned Example 7, and 7.5 g of 1,2-dichlorobenzene were added. The mixture was kept at 140° C. to dissolve 2,5-DMPO methacrylate and then cooled to 80° C. To this solution, a solution prepared by dissolving 13.5 mmol of methyl methacrylate as a copolymerizable monomer and 0.27 mmol of 1,1'-azobis(cyclohexane-1-carbonitrile) as a radical polymerization initiator in 1.33 g of 1,2-dichlorobenzene under argon atmosphere was slowly dropped, and the mixture was vigorously stirred for 24 hours. After 24 hours, 200 ml of methanol was added in portions to the reaction solution, and the precipitated polymer was obtained by filtration. The precipitate was washed with 100 ml of methanol and dried under reduced pressure at 60° C. for 6 hours to obtain a polymer (yield: 80.3%).

The analysis results of the polymer are shown in Table 1. The resultant polymer was dissolved in 1,2-dichlorobenzene-$d_4$ and subjected to NMR analysis (LA600 manufactured by JEOL) at 120° C. to find peaks at 1.13 ppm (3H), 2.23 ppm (6H), 3.64 ppm (3H), and 6.78 ppm (2H,s) in the $^1$H NMR spectrum (600 MHz). These results of the $^1$H NMR measurement showed that the polymer was a copolymer obtained by radical polymerization of 2,5-DMPO methacrylate and the methacryloyl group of phenyl methacrylate, and the contents of both structural units in the copolymer were found to be 0.02 mol % and 99.98 mol %, respectively.

Each of the polymers obtained by the above-mentioned Reference examples 1 and 2 and Examples 1 to 11 was powdery and had an average particle diameter of about 2 mm or less measured with the naked eye.

TABLE 1

|  | Mn (oDCB/140° C.) | Mw | Tc [° C.] | Hc [J/g] | Tm [° C.] | Hm [J/g] |
|---|---|---|---|---|---|---|
| Reference example 1 | 2700 | 11500 | 228[1] | 10[1] | 287[1] | 35[1] |
| Reference example 2 | 2400 | 10400 | 245[1] | 30[1] | 289[1] | 38[1] |
| Example 1 | 3100 | 11300 | 239[1] | 17[1] | 295[1] | 36[1] |

TABLE 1-continued

| | Mn (oDCB/140° C.) | Mw | Tc [° C.] | Hc [J/g] | Tm [° C.] | Hm [J/g] |
|---|---|---|---|---|---|---|
| Example 2 | 5100 | 14800 | 266[1] | 26[1] | 310[1] | 32[1] |
| Example 3 | 5800 | 15500 | 236[2] | 5[2] | 290[2] | 8[2] |
| Example 4 | 4900 | 14800 | 231[2] | 7[2] | 287[2] | 17[2] |
| Example 5 | 2800 | 10300 | 261[1] | 38[1] | 300[1] | 14[1] |
| Example 6 | 2700 | 7900 | 265[2] | 41[2] | 304[2] | 26[2] |
| Example 7 | 2900 | 9700 | 262[2] | 42[2] | 302[2] | 28[2] |
| Example 8 | 3800 | 8900 | n.d.[3] | n.d.[3] | n.d.[3] | n.d.[3] |
| Example 9 | 4500 | 11100 | n.d.[3] | n.d.[3] | n.d.[3] | n.d.[3] |
| Example 10 | 16600 | 31300 | n.d.[3] | n.d.[3] | n.d.[3] | n.d.[3] |
| Example 11 | 24900 | 52600 | n.d.[3] | n.d.[3] | n.d.[3] | n.d.[3] |

[1] Measured according to Measurement example 1
[2] Measured according to Measurement example 2
[3] Not observed In the following Table 2, for the resultant resin compositions comprising the graft copolymer obtained by Example 8 to 11, the average values of number of total structural units per molecule contained in the resin composition and number of the structural units of the formula (IV) or the formula (V) per molecule on average, are shown, respectively. Herein, these average values were calculated based on the number-average molecular weight calculated with gel permeation chromatography and the content, measured by NMR analysis, of structural unit of the formula (IV) or the formula (V) in the graft copolymer.

TABLE 2

| | Average values of number of total structural units ((IV) + (V)) per polymer molecule contained in resin composition | Average values of number of the structural units of formula (IV) per polymer molecule in resin composition | Average values of number of the structural units of formula (V) per polymer molecule in resin composition |
|---|---|---|---|
| Example 8 | 14.50 | 0.90 | 13.60 |
| Example 9 | 40.40 | 0.16 | 40.24 |
| Example 9 | 153.0 | 0.46 | 152.54 |
| Example 10 | 247.4 | 0.05 | 247.35 |

Having described our invention as related to the present embodiments, it is our intention that the invention not be limited by any of the details of the description, unless otherwise specified, but rather be construed broadly within its spirit and scope as set out in the accompanying claims.

What we claim is:

1. A (2,5-disubstituted-1,4-phenylene oxide) block copolymer which comprises one or more block structural units represented by the following formula (I) and at least one structural unit represented by the following formula (II) or the following formula (III) in a molecule,

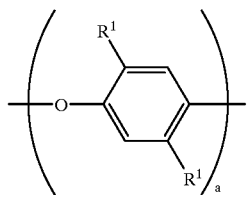
(I)

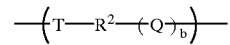
(II)

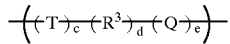
(III)

wherein $R^1$ represents an unsubstituted hydrocarbon group or a substituted hydrocarbon group, and the two $R^1$s may be the same or different; $R^2$ represents an unsubstituted arylene group or a substituted arylene group; $R^3$ represents an unsubstituted alkylene group, a substituted alkylene group, an unsubstituted aralkylene group, a substituted aralkylene group, an unsubstituted alkenylene group, a substituted alkenylene group, an unsubstituted aralkenylene group, a substituted aralkenylene group, an unsubstituted alkynylene group, a substituted alkynylene group, an unsubstituted aralkynylene group, or a substituted aralkynylene group; T represents —CO—, —CONH— or —SO$_2$—; Q represents —O—, —CO—, —SO$_2$—, —OCO—, —NHCO—, or —OSi(CH$_3$)$_2$—; a represents a number average degree of polymerization and is the number of 5 or more; and b, c, d, and e are each 1 or 0, and at least one of c, d, or e is 1.

2. The (2,5-disubstituted-1,4-phenylene oxide) block copolymer according to claim 1, wherein a in the formula (I) is 5 to 5,000, and, in a molecule, the number of the block structural units represented by the formula (I) is 1 to 1,000 and the number of the structural units represented by the formula (II) and/or the formula (III) is 1 to 1,000,000.

3. The (2,5-disubstituted-1,4-phenylene oxide) block copolymer according to claim 1, wherein the copolymer is a powder having an average particle diameter of 5 mm or less.

4. The (2,5-disubstituted-1,4-phenylene oxide) block copolymer according to claim 1, wherein the copolymer shows an exothermic peak of crystallization of 5 J/g or more at 150° C. or more when cooled after being melted, and/or the polymer shows an endothermic peak of crystal melting of 5 J/g or more at 150° C. or more when re-heated after the melted polymer is cooled.

5. The (2,5-disubstituted-1,4-phenylene oxide) block copolymer according to claim 1, wherein the copolymer is substantially free from gel substance.

6. The (2,5-disubstituted-1,4-phenylene oxide) block copolymer according to claim 1, wherein the two $R^1$s are alkyl groups with 1 to 6 carbon atoms; $R^2$ is 1,4-phenylene group, 1,3-phenylene group, 2,5-dimethyl-1,4-phenylene group, or 2,6-naphthylene group; $R^3$ is an alkylene group with 1 to 20 carbon atoms or an alkenylene group with 2 to 10 carbon atoms; T is —CO—; Q is —O— or —CO—; a is 15 or more but 100 or less; and d and e are each 1.

7. A (2,5-disubstituted-1,4-phenylene oxide) graft polymer which comprises one or more structural units represented by the following formula (IV), or three or more of structural unit of the following formula (IV) and structural unit of the following formula (V), in a molecule,

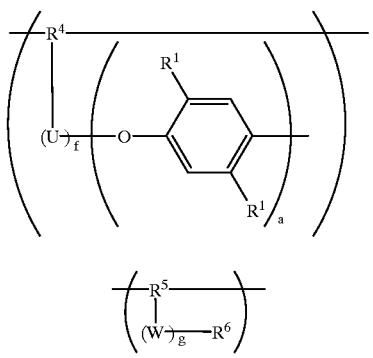 (IV)

(V)

wherein $R^1$ represents an unsubstituted hydrocarbon group or a substituted hydrocarbon group, and the two $R^1$s may be the same or different; $R^4$ and $R^5$ each represents a trifunctional unsubstituted hydrocarbon group or a trifunctional substituted hydrocarbon group; $R^6$ represents a hydrogen atom, a halogen atom, an unsubstituted hydrocarbon group, or a substituted hydrocarbon group; U represents —CO—, —OCO—, or —NHCO—; W represents —O—, —CO—, —$CO_2$— —OCO—, or —CONH—; a represents a number average degree of polymerization and is the number of 5 or more; and f and g are each 1 or 0.

8. The (2,5-disubstituted-1,4-phenylene oxide) graft polymer according to claim 7, wherein a in the formula (IV) is 5 to 5,000, and, in a molecule, the number of the structural units represented by the formula (IV) is 1 to 100,000 and the number of the structural units represented by the formula (IV) and/or the formula (V) is 3 to 1,000,000.

9. The (2,5-disubstituted-1,4-phenylene oxide) graft polymer according to claim 7, wherein f in the formula (IV) is 1.

10. The (2,5-disubstituted-1,4-phenylene oxide) graft polymer according to claim 7, wherein the polymer is a powder having an average particle diameter of 5 mm or less.

11. The (2,5-disubstituted-1,4-phenylene oxide) graft polymer according to claim 7, wherein the polymer shows an exothermic peak of crystallization of 5 J/g or more at 150° C. or more when cooled after being melted, and/or the polymer shows an endothermic peak of crystal melting of 5 J/g or more at 150° C. or more when re-heated after the melted polymer is cooled.

12. The (2,5-disubstituted-1,4-phenylene oxide) graft polymer according to claim 7, wherein the polymer is substantially free from gel substance.

13. The (2,5-disubstituted-1,4-phenylene oxide) graft polymer according to claim 7, wherein the two $R^1$s are an alkyl groups with 1 to 6 carbon atoms; $R^4$ and $R^5$ are each

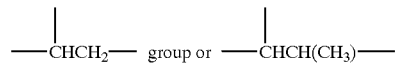

group; $R^6$ is a fluorine atom or a chlorine atom; U is —CO—; W is —$CO_2$—; a is 15 or more but 100 or less; and f is 1.

14. A resin composition which comprises the (2,5-disubstituted-1,4-phenylene oxide) block copolymer according to claim 1.

15. A resin composition which comprises the (2,5-disubstituted-1,4-phenylene oxide) graft polymer according to claim 7.

* * * * *